United States Patent Office 3,095,303
Patented June 25, 1963

3,095,303
STYRYL DYE BASE COMPOSITION AND PHOTOGRAPHIC PROCESSES FOR PRODUCING LITHOGRAPHIC SURFACES PHOTORESISTS AND PRINTS THEREWITH
Robert H. Sprague, Cleveland, Harry L. Fichter, Jr., Lakewood, and William P. Hamilton, Cleveland, Ohio, assignors to Horizons Incorporated, Cleveland, Ohio, a corporation of New Jersey
No Drawing. Filed July 12, 1960, Ser. No. 42,233
15 Claims. (Cl. 96—33)

This invention relates to a photographic process capable of producing colored photographic prints. The process is suitable for producing prints of a specific single color as well as full-color photographic prints involving suitable utilization of the primary colors of the visible spectrum. A further aspect of the invention is the availability of a photo system suitable for the production of photoresists, lithographic printing surfaces, and the like.

In copending United States patent applications filed by Eugene Wainer including the following serial numbers:

787,112, filed January 16, 1959, now U.S. Patent 3,042,515, issued July 3, 1962
841,459, filed September 22, 1959
841,460, filed September 22, 1959, now U.S. Patent 3,042,516, issued July 3, 1962
842,569, filed September 28, 1959, now U.S. Patent 3,042,517, issued July 3, 1962
1,161, filed January 8, 1960, now U.S. Patent 3,042,518, issued July 3, 1962
1,162, filed January 8, 1960, now U.S. Patent 3,042,519, issued July 3, 1962
22,703, filed April 18, 1960, now U.S. Patent 3,056,673, issued Oct. 2, 1962, and
23,130, filed April 19, 1960, now U.S. Patent 3,046,125, issued July 24, 1962 a variety of photo systems are described, utilizing in the main combinations of various aromatic amines, organic compounds containing halogens, and plastic bases suitably disposed on an applicable substrate. In said applications, exposure to light alone or exposure to light followed by heat treatment is sufficient to produce colored print-out images at high speeds from an originally substantially colorless product. The assumption was made that the mechanism of operation of the photochemical reaction in these photo systems involved the formation of free radicals, based on the photolytic dissociation of the organic halogen compound as the result of light absorption by such organic halogen compounds. As a consequence, the spectral sensitivity of such previously described reactions was assumed to be dependent upon the spectral range in which this organic halogen compound would absorb light and break up into free radicals.

We have found that use of a specific class of organic compounds in place of the aromatic amines disclosed in the aforesaid Wainer applications, results in a photo system which is essentially different from that described in the aforesaid Wainer applications.

Specifically, we have found that a family of weakly colored dyes or dye progenitors, belonging to the class of styryl dye bases and their higher vinylene homologs, are capable of producing intense colors of high brilliance with narrow spectral ranges of absorption when utilized as a photo system in combination with suitable organic halogen-containing compounds. The variety of the colored styryl-base type compounds and their vinylene homologs is sufficiently broad to blanket the visible range with respect to their light-absorption qualities and also with respect to the nature of the color which can be produced as the result of exposure to light when utilized in combination with suitable organic halogen compounds. More important, however, as distinguished from the photo systems of the aforementioned Wainer applications, is the fact that through use of such dye bases a full range of sensitivity to the visible is available. In view of the broad variety of dye bases available from the class indicated, it is thus possible in the present photo system to expose a blue-sensitive variety to blue light to yield an intense yellow color, a green-sensitive variety to green light to produce a magenta color, a red-sensitive variety to red light to produce a cyan color, etc. The color of the developed image is thus complementary to the color of the exposing light, which is a necessary characteristic of a color negative material. The sharp cutting absorption, both of the progenitor and the color form produced as the result of exposure to light, is such that increments of absorption throughout the visible spectrum may be produced as desired for specialized effects.

While we do not wish to be bound to any specific theory as to the reason for the ability to blanket the visible with respect to sensitivity and development of color, it appears that, either as a result of exposure to light or possibly simply as the result of mixture of the organic halogen-containing compound and the weakly colored dye, a complex is formed which requires less energy to raise it to an excited state to permit the desired photolytic reaction to take place than when such complexes do not form.

It has been pointed out that the dye progenitor is weakly colored and, as a result of exposure to light in the presence of the organic halogen compound, a brilliant, intense, sharp cutting color is obtained. Equally important as the foregoing is our finding that, as a result of exposure to light with or without subsequent development by heat, a sharp difference in solubility in certain solvents exists between unexposed and exposed areas. This finding is of exceptional importance in order to eliminate any residual color which may exist from the progenitor itself and which might mask the desired print-out effects. More important than the elimination of such color-masking effects is the fact that such differences in solubility may be utilized for fixing and stabilization of the printed image. Equally important is our finding that, as a result of such solvent extraction, hydrophilic-hydrophobic differentiation is available, depending on whether or not the areas have been exposed to light. Thus, it appears that the developed-out dye image is ionic in character, exhibits hydrophilic properties, and tends to be insoluble in non-polar solvents; whereas the unexposed dye progenitor, even in the presence of the organic halogen-containing compound, is a covalent non-ionic compound, soluble in a variety of organic solvents, and tends to be hydrophobic in character. Such hydrophobic properties may be enhanced by placing the photo system on a hydrophobic base. As a consequence, the system can be utilized as a foundation of photoetch processes and as a means for producing a lithographic plate.

Solvents which may be utilized for the above described fixing and developing include ethers, esters, chlorinated solvents, benzene, toluene, and the like. A differentiation is obtained even with water-compatible solvents such as acetone.

In general terms, therefore, our novel photosensitive system is utilized in a variety of ways. If it is desired to produce a single color of permanent nature as a result of a printout reaction in the visible, a weakly colored styryl dye base is chosen having absorption characteristics compatible with the source of light available in the visible. By virtue of its inherent color, the choice is simplified. This is combined with a suitable organic halogen-containing compound and placed on a suitable substrate. After exposure to light, a print-out image of intense brilliance is obtained, the unexposed portions remaining the original color. The development of color may be enhanced by a brief heating for between 1 and 10 seconds at approximately 85–100° C. and preferably about 100° C. prior to solvent fixing. The developed print is then treated with a solvent, such as ether or benzene, which removes the undecomposed dye base, leaving only the developed image fixed to the substrate.

By utilizing multipacks, with an appropriate selection of dye bases and exposure to the full spectral range of visible light, full-color prints may be obtained. Thus when utilizing multipacks, exposure of the film to a colored subject produces a negative image in colors complementary to the exposing light. After removal of the unexposed light-sensitive material by solvent extraction, a contact print through the negative on a second sheet of the same sensitive film results in a positive image in the same colors as the original exposure. Removal of unexposed light-sensitive material by solvent extraction of the positive print gives a stable product.

Full color prints may also be obtained by printing registered dot patterns of the combination of styryl base and suitable organic halogen compounds on a white or transparent backing. By utilizing known printing techniques of high resolution, the various color progenitors may be placed sufficiently close to each other so that, as a result of exposure and fixing, a full color rendition is obtained. Conversely, color-separation negatives may be obtained by standard techniques utilizing simultaneous exposures in one-shot three-color cameras available commercially.

The invention may be utilized as a foundation for a lithographic plate by minor modifications of the foregoing procedure.

The process may be modified by placing the photosensitive system on a hydrophilic substrate, such as paper, and then washing out the developed dye image with water so as to expose the paper backing in these areas. In this case, the unexposed, undecomposed system is hydrophobic and the exposed portions are hydrophilic, even though no developed dye color remains in the hydrophilic areas. Washing out the developed image with water in this way does not remove either the unexposed styryl dye base or the unreacted organic halogen compound or the complex which may have formed by combination of the two. It is therefore possible, after drying the washed sheet, to re-expose with a blanket exposure to light and cause development of the remaining light-sensitive material, giving a positive image which requires no fixing. Our new process is thus applicable to direct positive photocopy, capable of copying colored as well as black-and-white materials.

Thus the photosensitive systems of this invention comprise a light-sensitive coating composed of a mixture of a styryl dye base with a halogen-containing source of photolytically producible free radicals, either coated on a substrate or suitably dispersed in a solution of a binder such as nitrocellulose, polystyrene, ethyl cellulose, polyvinyl chloride, Saran, or the like, and subsequently coated on a substrate either as an adherent coating or as a non-adhering or strippable self-sustaining film.

The dye bases useful for the purposes of our invention are of two general types. The first is the styryl base type, obtained through the medium of aldehyde condensation reactions on heterocyclic bases containing an active methyl group, such condensation reactions being known to those skilled in the art. The types of heterocyclic bases useful in such reactions include the following:

2-methylbenzothiazole
2-methylbenzimidazole
2-methylbenzoxazole
2-methylthiazoline
2-methylbenzoselenazole
1-methylisoquinoline
3-methylisoquinoline
2-methyl-α-naphthothiazole
2-methyl-β-naphthothiazole
2,4-dimethylthiazole
2-methyl-4-phenyloxazole
2,3,3-trimethylindolenine
Alpha-picoline
Gamma-picoline
Quinaldine
Lepidine
2-methyl-4-phenylthiazole
2-methylthiazole
2-methylthiopyranothiazole
2-benzothiazolylacetonitrile
2-quinolylacetonitrile
4-quinolylacetonitrile The second type of dye bases may be regarded as higher vinylene homologs of the styryl bases and may be obtained through the medium of condensation of the heterocyclic bases such as those listed above with cinnamal types of compounds, again as known to those skilled in the art of the development of such color bases.

The dye bases useful in the practice of this invention may be represented by the following general formula:

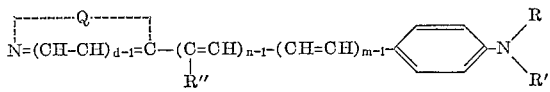

wherein R and R′ each represent monovalent radicals selected from the group consisting of lower alkyl (i.e., methyl, ethyl, n-propyl) and benzyl, and may be the same as one another or different from one another; R″ represents a monovalent radical selected from the group consisting of H and —CN; $d$ and $n$ each represent a positive integer which is either 1 or 2; $m$ is a positive integer not greater than 3; and the sum of $n-1$ and $m-1$ is not greater than 2; and Q represents the nonmetallic atoms necessary to complete a heterocyclic nucleus necessary to complete heterocyclic compounds such as those listed above.

One member of this group, having the Formula A and the chemical name 4-p-dimethylaminostyrylquinoline, is considered typical of the styryl dye base class:

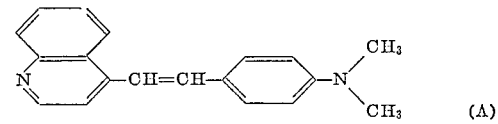

This particular styryl base in the presence of carbon tetrabromide has a maximum of sensitivity at 4700 A., with sensitivity extending to 5300 A. The maximum of absorption of this compound is at 4000 A., with absorption extending to 5000 A.

Typical of the higher vinylene homolog (butadienyl) type of dye bases is 4-[4-(p-dimethylaminophenyl)-1,3-butadienyl]quinoline, designated (B) and shown below:

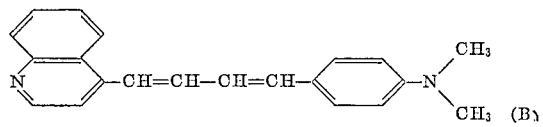

This base has a maximum of sensitivity at 4700 A., with sensitivity extending to 5700 A. The absorption maximum of (B) is at 4060 A., with absorption extending to 5100 A.

In addition to the styryl dye bases described above, the photosensitive system of our invention includes an organic halogen-containing compound. Those organic halogen-containing compounds which may be utilized must be capable of photolytic dissociation on exposure to light at a chosen wavelength.

We have found that alkyl and aralkyl compounds, in which at least three halogen atoms are attached to a single carbon atom, are particularly sensitive in the photosystems of this invention. Compounds which have been found to be effective include the following:

Carbon tetrabromide
Carbon tetrachloride
Chloroform
Bromoform
Hexachloroethane
Hexabromoethane
Benzotrichloride Benzotribromide
p-Nitrobenzotribromide
Pentabromoethane
Bromotrichloromethane
Carbon tetraiodide
Iodoform
Chloral
Bromal
1,1,1-tribromo-2-methyl-2-propanol
1,1,2,2-tetrabromoethane
1,1,2,2-tetrabromoethylene
2,2,2-tribromoethanol
Hexachloropropene
$\alpha,\alpha,\alpha,\alpha',\alpha',\alpha'$-Hexachloro-p-xylene
$\alpha,\alpha,\alpha,\alpha',\alpha',\alpha'$-Hexachloro-m-xylene
Trichloroacetamide
Trichloroacet-dimethylamide
1,1,1-trichloro-2-methyl-2-propanol
$\alpha,\alpha,\alpha$-trichlorotoluene It is preferred that the combination of styryl dye base and organic halogen-containing compound be dispersed in a film-forming binder such as any of those disclosed in the aforementioned Wainer applications.

Suitable film-forming binder solutions include the following:

Ethyl cellulose in methyl alcohol
Nitrocellulose in methyl alcohol or acetone
Polystyrene in benzene
Polyvinylchloride in tetrahydrofuran
Polyvinylidene copolymer in methyl ethyl ketone
Cellulose acetate in acetone
Polyvinyl acetate in toluene plus acetone In addition, conventional plasticizers may be incorporated into the above solutions or, if desired, hydrocarbons may be added as a diluent in the composition. Suitable hydrocarbon diluents, which appear to play no part in the photochemical reaction include paraffin- and isoparaffin-hydrocarbons, having the general formula $C_nH_{2n+2}$, wherein $n$ ranges from about 10 up to 70. When added to the system, it is preferred that they be added in solution. (See Example 2, below.)

In the compositions of the present invention it is preferred to provide between about 10 and 100 parts by weight of the organic halogen-containing compound for each part by weight of styryl dye base, dispersed or dissolved in about 200 parts by weight of a 10% solution of a film-forming plastic.

Having described our invention in general terms, the following examples are indicative of specific methods of practice and are to be construed as illustrative rather than as limitative of the invention.

*Example 1*

One hundred milligrams (100 mg.) of 4-(4-dimethylamino phenyl-1,3-butadienyl) quinoline added to 16 cc. of a 10% solution in acetone of one-half second nitrocellulose, containing 2.8 grams of carbon tetrabromide, and coated on white opaque PVC exhibited sensitivity over the visible spectral range between 3900 A. and 5700 A. when exposed on a Bausch and Lomb 250 mm. grating monochromator. Peak sensitivity occurred at 4700 A., with 15 seconds exposure at 5 mm. slit width required to give a reflection density of 1.0. Spectrograms made on a Cenco grating spectrograph corroborate these findings.

Coatings were made on white, opaque polyvinyl chloride sheets, using a vacuum plate and a drawn-down applicator with .0005 inch opening. Coatings of this composition, when exposed at $f$—4.5 in a camera, give excellent negative print-out images in 2.5 minutes, using near-noonday sun for illumination. The same composition gave excellent print-out images when used in a copying camera, with the subject being illuminated for 5 minutes by two 500-watt photoflood lamps. This coating exhibited sufficient speed for an image to print out when a negative was projected to it through an enlarger.

*Example 2*

Two hundred milligrams (200 mg.) of 4-p-dimethylaminostyrylquinoline added to 19 cc. of a 10% polystyrene solution in benzene, and containing 1 cc. of a solution of 10% eicosane in benzene and 2.8 grams carbon tetrabromide, yielded print-out images when exposed in the manner described in Example 1.

*Example 3*

Fifty milligrams (50 mg.) of 4-p-dimethylaminostyrylquinoline added to 16 cc. of a 10% nitrocellulose solution in acetone, and containing 2.8 grams carbon tetrabromide, gave excellent print-out images when used as described in Example 1. Sensitivity is apparent over the visible range from 3900 A. to 5300 A., with peak sensitivity at 4700 A.

*Example 4*

One hundred milligrams (100 mg.) of 2-p-dimethylaminostyrylquinoline added to 16 cc. of a 10% nitrocellulose solution in acetone, containing 2.8 grams carbon tetrabromide, gave excellent print-out images when used as described in Example 1. Sensitivity was observed between 3900 A. and 5200 A., with peak sensitivity at 4500 A.

*Example 5*

Fifty milligrams (50 mg.) of 2-(4-dimethylaminophenyl-1,3-butadienyl) quinoline added to 16 cc. of 10% nitrocellulose in acetone, and containing 2.8 grams carbon tetrabromide, gave excellent print-out images when used as described in Example 1. Sensitivity was observed between 3900 A. and 5100 A., with peak sensitivity at 4700 A.

*Example 6*

Fifty milligrams (50 mg.) of 2-p-dimethylstyrylbenzothiazole added to 16 cc. of 10% nitrocellulose in acetone, and containing 2.8 grams carbon tetrabromide, gave excellent print-out images when used as described in Example 1. Sensitivity between 3900 A. and 4900 A. was observed, with peak sensitivity at 4500 A.

*Example 7*

A photograph prepared on a paper base in the manner described in Example 1 and briefly immersed in ethyl acetate or warm benzene was found to be fixed and no longer photographically active when the solvent dissolved away the unreacted light-sensitive ingredients, leaving the dye image formed on exposure.

*Example 8*

To five cubic centimeters of a one-percent solution of the styryl base 4-p-dimethylaminostyryl quinoline in acetone was added 0.5 gram carbon tetrabromide. This mix was coated on a multilith master and exposed under a negative to two G.E. 275-watt sunlamps for one minute. An excellent image printed out. After swabbing the print with water, the master was mounted in the duplicating machine and the machine run in the usual manner. The water-swabbed area picked up ink in the image area and transferred it to the receiving sheet, with little or no ink in the background.

*Example 9*

A solution of 100 mg. of 4-p-dimethylaminostyrylquinoline, 2.8 grams $CBr_4$ and 100 mg. of eicosane in 15 ml. of acetone was coated on a casein-surfaced paper sheet. This was exposed under a positive transparency to a photoflood lamp, giving a negative photocopy. The sheet was swabbed with a weakly acid buffer solution which washed away the negative image, leaving the weakly colored styryl base unchanged. Re-exposure to the photoflood lamp resulted in darkening of the previously unexposed area, giving a positive copy of the original transparency.

While not necessary for the purposes of our invention, the permanence and brilliance of the color images produced may be enhanced by the formation of lakes through treatment with metal salt solutions such as salts of copper, chromium, cobalt, phosphotungstic acid, phosphomolybdic acid, aluminum, and the like.

Having now described our invention in accordance with the patent statutes, we claim:

1. A photosensitive composition comprising a photolytically active organic halogen-containing compound selected from the group consisting of compounds capable of being split by absorption of light into free radical fragments consisting of halogen free radicals and organic free radicals, and selected from the group consisting of alkyl and aralkyl compounds in which at least three halogen atoms are attached to a single carbon atom and a compound selected from the group consisting of styryl dye bases and vinylene homologues thereof represented by the formula:

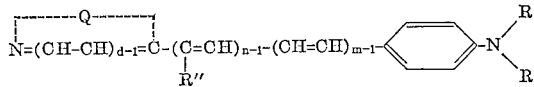

wherein R and R' each represent monovalent radicals selected from the group consisting of lower alkyl and benzyl, and may be different from one another; R'' represents a monovalent radical selected from the group consisting of H and —CN; $d$ and $n$ each represent a positive integer which is not greater than 2; $m$ is a positive integer not greater than 3; and the sum of $n-1$ and $m-1$ is not greater than 2; and Q represents the nonmetallic atoms necessary to complete a heterocyclic nucleus having at least 5 and not more than 6 members in the ring, said halogen compound being present in an amount sufficient to sensitize said dye base.

2. The composition of claim 1 wherein the photolytically active organic halogen-containing compound is one in which at least three bromine atoms are attached to a single carbon atom.

3. The composition of claim 1 dispersed in a film-forming plastic.

4. The composition of claim 3 as a self-supporting film.

5. The composition of claim 3 coated on a solid supporting substrate.

6. The composition of claim 1 wherein the organic halogen-containing compound is carbon tetrabromide.

7. The composition of claim 1 wherein the relative proportions of the photolytically active organic halogen-containing compound to styryl dye base are between about 10 and 100 parts by weight of organic halogen-containing compound for each part by weight of dye base.

8. A multiplayer pack for producing colored photographic prints which comprises a plurality of layers each of which comprises a composition according to claim 1, each of said layer compositions being sensitive to light of a wave-length different from the wave-length to which any other of said compositions is sensitive; said layers being on a solid supporting surface.

9. A process for producing colored photographic prints which comprises preparing at least one composition according to claim 1; coating a solid supporting surface therewith, exposing the resulting article to a colored subject, thereby producing a negative image in color complementary to said colored subject.

10. The process of claim 9 wherein the image is intensified by heating for between 1 and 10 seconds after exposure.

11. The process of claim 9 wherein the developed print is treated with a solvent to wash away the undecomposed dye base.

12. A process for producing a positive image where a negative produced by the process of claim 9 is printed onto another sheet of the same material.

13. The process of claim 9 wherein the permanence and brilliance of the color image produced is enhanced by treating the image with a metal salt solution to form a lake.

14. The process of claim 9 wherein the substrate is paper and after the colored image is produced, washing the developed image with water, drying the washed sheet, re-exposing the same with a blanket exposure, thereby producing a positive image of the subject.

15. A process for producing a litho master, comprising preparing the composition of claim 1; coating a casein-filled paper therewith; exposing the composition to light through a suitable negative, thereby producing a positive image in color; swabbing the exposed sheet with water to render the background ink-repellent, the image area then being ink-receptive.

References Cited in the file of this patent

UNITED STATES PATENTS

| | | |
|---|---|---|
| 1,574,357 | Beebe et al. | Feb. 23, 1926 |
| 1,658,510 | Beebe et al. | Feb. 7, 1928 |
| 2,465,412 | Wilson | Mar. 29, 1949 |
| 2,492,952 | Ball et al. | Jan. 3, 1950 |
| 2,639,282 | Sprague et al. | May 19, 1953 |
| 2,899,430 | Sprague | Aug. 11, 1959 |
| 2,953,561 | Doorenbos | Sept. 20, 1960 |